United States Patent [19]
Silberman

[11] 3,957,268
[45] May 18, 1976

[54] METHOD AND APPARATUS FOR ASSEMBLY OF TABLE TENNIS TABLE

[75] Inventor: Ira J. Silberman, Opelika, Ala.

[73] Assignee: Diversified Products Corporation, Opelika, Ala.

[22] Filed: Mar. 26, 1975

[21] Appl. No.: 562,218

[52] U.S. Cl. .................................. 273/30; 403/159; 108/157; 52/760
[51] Int. Cl.² ........................................... A63B 59/04
[58] Field of Search ................... 273/30; 108/13, 17, 108/150, 153, 154, 157–159; 287/189.35, 118; 403/159; 248/250, 214, 215; 52/760, 715, 712

[56] References Cited
UNITED STATES PATENTS

| | | | |
|---|---|---|---|
| 1,062,355 | 5/1913 | Pfeifer | 52/712 X |
| 2,480,479 | 8/1949 | Keleher | 248/215 |
| 2,535,920 | 12/1950 | Hart | 108/157 X |
| 2,609,264 | 9/1952 | Poe | 52/760 X |
| 2,687,836 | 8/1954 | Rhodes et al. | 248/215 X |
| 2,711,873 | 6/1955 | Larin | 248/215 |
| 3,049,388 | 8/1962 | Browne | 108/157 |
| 3,091,487 | 5/1963 | Gallagher et al. | 108/64 X |
| 3,371,900 | 3/1968 | Jacobs | 248/215 X |
| 3,536,287 | 10/1970 | Kramer | 248/215 |
| 3,616,956 | 11/1971 | Cooper | 52/760 X |

*Primary Examiner*—Richard C. Pinkham
*Assistant Examiner*—T. Brown
*Attorney, Agent, or Firm*—Schuyler, Birch, Swindler, McKie & Beckett

[57] ABSTRACT

A method and apparatus are disclosed for attaching the top of a table tennis table to a tubular apron which supports the table top. The table top has planar upper, lower end and side surfaces. The tubular apron has a substantially planar upper wall for supportingly engaging the lower surface of the table top. The table top and tubular apron are attached to each other by a clip which is formed of steel having a thickness of approximately 0.050 inch. The clip comprises a right angled J-shaped portion, and a pronged leg extending from one end of the J-shaped portion at an acute angle of approximately 45°. One end of the J-shaped portion frictionally engages the upper surface of the table top while the pronged leg bitingly engages an inner wall surface of the tubular apron to retain the clip in position, thus fixedly attaching the top to the apron.

8 Claims, 5 Drawing Figures

METHOD AND APPARATUS FOR ASSEMBLY OF TABLE TENNIS TABLE

BACKGROUND OF THE INVENTION

1. Field of the Invention

This invention relates to table tennis tables and, more particularly, to a method and apparatus for attaching the top of a table tennis table to a tubular apron.

2. Description of the Prior Art

In the table tennis art, it is well known to provide a table tennis table having a top which is affixed to apron-like supporting members by fasteners, such as screw, nails, bolts, etc. In turn, the apron-like members normally are supported by a plurality of depending legs hingedly affixed to the apron-like members.

Although conventional table tennis tables function adequately, assembly of the tables is difficult, time-consuming, and expensive. Many drilling operations usually are required before the table top and apron-like members can be assembled with the fasteners. Further, the holes in the top and members for accommodating the fasteners must be accurately aligned. Additionally, any mistakes in the drilling operations, even though quite small, can damage the table top, requiring the use of a filler material or the scrapping of an entire top. It also will be obvious that assembly of such a table is difficult and time-consuming because of the accuracy required in the drilling operations and the time required to position and lock the fasteners.

Accordingly, it is an object of the present invention to provide a new and improved table tennis table and method of assembly of such table wherein the top of a table tennis table may be attached accurately and quickly to an apron-like member.

It is another object of the invention to provide a new and improved table tennis table and method of assembly of such table wherein the expense of assembly is minimized substantially.

It is a further object of the invention to provide a new and improved table tennis table wherein the components thereof may be assembled with a minimum of attention to detail and without the possibility of damage to the table top.

It is an additional object of the invention to provide an improved clip for fixedly attaching the top of a table tennis table to a tubular apron for supporting the top.

SUMMARY OF THE INVENTION

In carrying out the invention, in one form therof, a table tennis table includes a top attached to a tubular apron by a clip. The top has planar upper, lower, end and side surfaces, and the apron has a substantially planar upper wall for supportingly engaging the lower surface of the top. The clip is formed of steel having a thickness of approximately 0.050 inch, and comprises a right angled J-shaped portion and a pronged leg extending from one end of the J-shaped portion at an acute angle of approximately 45°. One end of the J-shaped portion frictionally engages the upper surface of the top while the pronged leg bitingly engages an inner wall surface of the apron to retain the clip in position, thus fixedly attaching the top to the apron.

DESCRIPTION OF THE PREFERRED EMBODIMENT

Components

Figure 1:
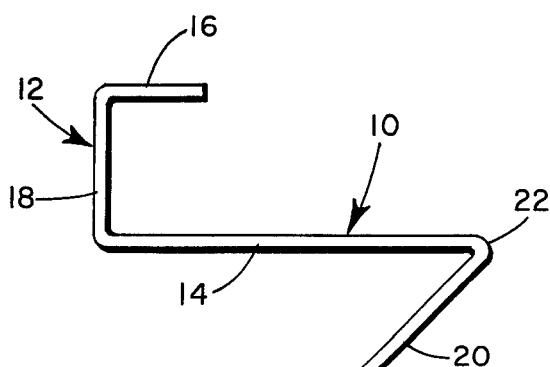
FIG. 1 is a side elevational view of one form of a clip according to the invention.
Figure 2:
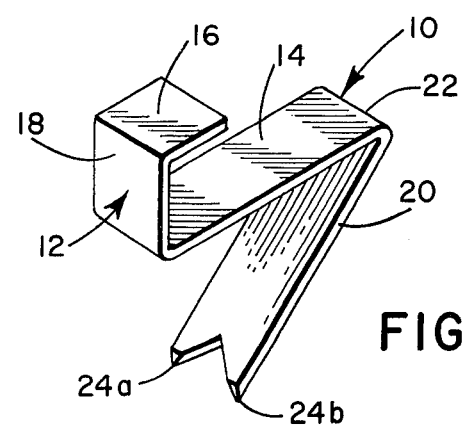
FIG. 2 is a perspective view of the clip of FIG. 1.

FIGS. 1 and 2 show a clip 10. As illustrated, clip 10 is formed of steel having a thickness of approximately 0.050 inch. However, clip 10 also could be formed of any other well known material of suitable strength, such as plastic, aluminum, etc.

Clip 10 comprises a right angled J-shaped portion 12 having a first leg 14, a second leg 16, and a central connecting portion 18. A pronged leg 20 is affixed to and extends downwardly and outwardly from the outer end 22 of first leg 14. As illustrated in FIG. 2, a pair of prongs 24a and 24b are formed at the end of leg 20 distal from outer end 22 of first leg 14.

Figure 3:
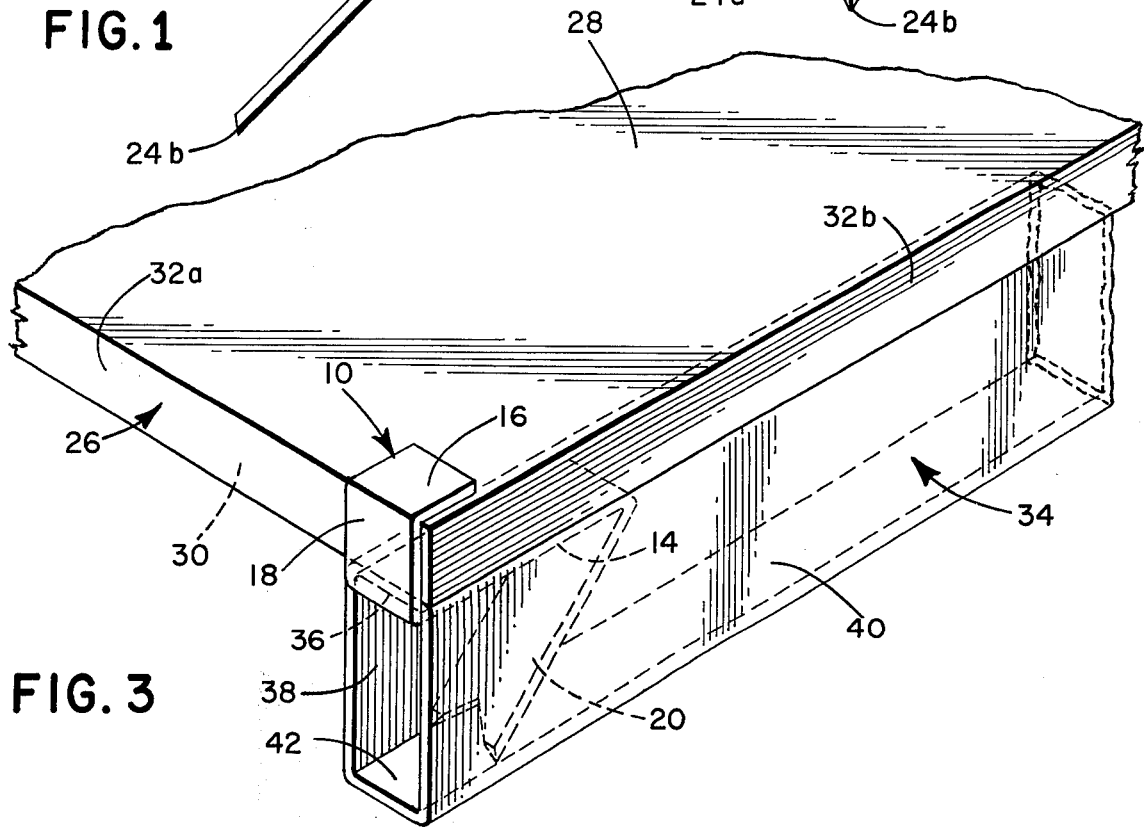
FIG. 3 is a partial perspective view of the top of a table tennis table and a tubular apron for supporting the top, and showing the manner in which the top is attached to the apron by means of the clip shown in FIGS. 1 and 2.

FIG. 3 illustrates portions of the top and supporting apron of a table tennis table assembled according to the present invention. A top 26 of a table tennis table comprises a planar upper surface 28, a planar lower surface 30, a planar end surface 32a and a planar side surface 32b. Top 26 is supported by a tubular apron 34 having a substantially rectangular transverse cross-section defined in part by a planar upper wall 36 adapted to uniformly engage bottom surface 30 of the top. Apron 34 additionally comprises inner side wall 38, outer side wall 40, and lower wall 42. Apron 34 may be formed of any well known structural material, although extruded steel tubing or bent steel sheet is preferred. Further, apron 34 may be formed in various shapes, although a rectangular cross-section is preferred.

Assembly

The table tennis table is assembled by placing table top 26 on tubular apron 34. Pronged leg 20 and first leg 14 of clip 10 are then inserted into the open end of apron 34 until connecting portion 18 of the clip engages the vertically aligned end surface 32a of top 26 and the end of upper wall 36 of the apron. When clip 10 is in this position, second leg 16 of the clip frictionally engages upper surface 28 of the top. The completed assembly is illustrated in FIG. 3. It will be noted that prongs 24a and 24b bitingly engage the inner surface of lower wall 42 of apron 34 so as to retain clip 10 in the above-described position, thus fixedly attaching table top 26 to apron 34. After assembly, an end cap (not shown) may be inserted into the open end of apron 34, if desired, in order to improve the appearance of the completed assembly. In addition, as is conventional, a plurality of depending legs (not shown) may be hingedly affixed to apron 34 to support the assembled table.

Alternative Clip Embodiments

Figure 4:
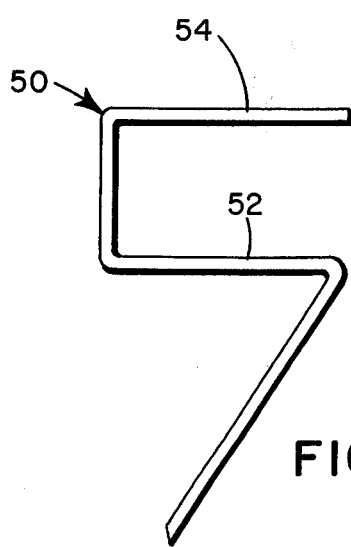
FIG. 4 is a view similar to FIG. 1, depicting an alternative embodiment of a clip according to the invention.
Figure 5:
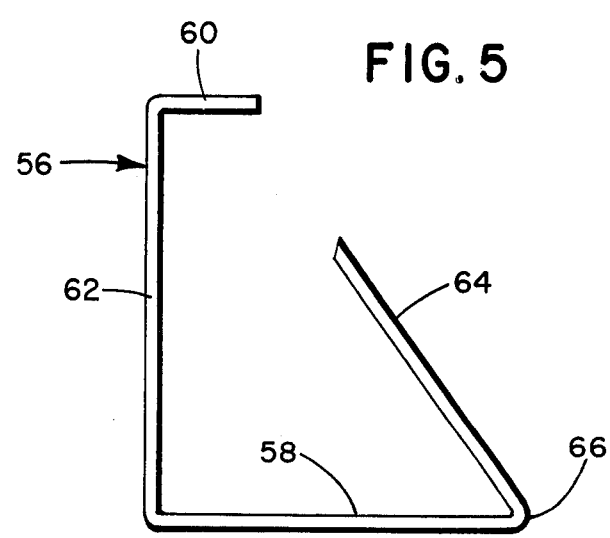
FIG. 5 is a view similar to FIG. 1, depicting another alternative embodiment of a clip according to the invention.

FIGS. 4 and 5 illustrate alternative embodiments of the clip according to the invention. The clip shown in FIG. 4 comprises a right angled U-shaped portion 50 having a first leg 52 and a second leg 54, which legs are substantially equal in length. The rest of the clip is identical in all respects to clip 10 and functions in the same manner to attach table top 26 to tubular apron 34.

The clip shown in FIG. 5 comprises a right angled J-shaped portion 56 having a first leg 58 and a shorter second leg 60. First leg 58 and second leg 60 are connected by a central connecting portion 62, which portion 62 extends from upper surface 28 of table top 26 to lower wall 42 of tubular apron 34. A pronged leg 64 sustantially identical to pronged leg 20 extends from the outer end 66 of first leg 58 at an acute angle of approximately 45°. However, pronged leg 64 extends upwardly and inwardly from end 66 in order to bitingly engage the inner surface of upper wall 36 of apron 34. It will be apparent that the clip illustrated in FIG. 5 functions in the same manner as the other clips herein illustrated to attach table top 26 to tubular apron 34.

The method and apparatus of the present invention overcome many of the difficulties associated with the assembly of prior table tennis tables The clips may be used alone or in conjunction with other fasteners for attaching the table top to a supporting apron-like member. Drilling operations are thereby eliminated or substantially reduced resulting in great savings of assembly time and cost. Also, time-consuming, accurate alignment of the components is eliminated. Further, the chance of damage occurring to the table top during assembly is minimized substantially.

While a specific embodiment of the invention has been described, it will be obvious to those skilled in the art that many changes and modifications may be made without departing from the scope of the invention. It is therefore intended that the appended claims cover all such changes and modifications that fall within the spirit and scope of the invention.

I claim:

1. A table comprising:

a top having planar upper, lower and end surfaces;

at least one tubular apron for supporting said top, said apron having a substantially planar top wall engaging said lower table surface; and a clip attaching said top to said apron, said clip frictionally engaging said upper table surface and bitingly engaging an inner wall surface of said apron.

2. The table of claim 1, wherein said clip comprises:

first, second and third substantially straight portions, said third portion being connected to each of said first and second portions with said third portion being disposed at substantially a right angle with respect to each of said first and second portions; and a leg said leg having a pronged portion at one end and having its other end affixed to one end of said first portion, said leg extending at an acute angle from said first portion to allow said pronged portion to bitingly engage said inner wall surface of said apron.

3. The table of claim 2, wherein said first, second and third portions form a substantially J-shaped member.

4. The table of claim 2, wherein said first, second and third portions form a substantially U-shaped member.

5. The table of claim 2, wherein said pronged leg extends outwardly from the said first portion.

6. The table of claim 2, wherein said pronged leg extends inwardly from said first portion.

7. The table of claim 2, wherein said angle is approximately 45°.

8. A method for attaching the top of a table to a tubular apron for supporting said top, comprising the steps of:

placing said top on said apron; and clipping said top to said apron by means of a clip, which clip frictionally engages the upper surface of said top and bitingly engages an inner wall surface of said apron.

* * * * *